United States Patent [19]

Tuchiya et al.

[11] Patent Number: 4,496,186
[45] Date of Patent: Jan. 29, 1985

[54] SEALING STRUCTURE FOR AN AUTOMOTIVE VEHICLE

[75] Inventors: Yoshimasa Tuchiya, Ebina; Takayo Chikaraishi, Kawasaki; Kazunori Kawamo, Atsugi, all of Japan

[73] Assignees: Nissan Motor Company, Limited, Yokohama; Nissan Shatai Company, Limited, Hiratsuka, both of Japan

[21] Appl. No.: 524,349

[22] Filed: Aug. 18, 1983

[30] Foreign Application Priority Data

Aug. 21, 1982 [JP] Japan ................................. 57-145354

[51] Int. Cl.³ .............................................. B60J 5/02
[52] U.S. Cl. ..................................... 296/146; 296/93; 49/491; 49/383
[58] Field of Search ......................... 296/146, 93, 213; 49/490, 491, 498, 383

[56] References Cited

U.S. PATENT DOCUMENTS

| | | | |
|---|---|---|---|
| 3,665,646 | 5/1972 | Niemanns | 49/490 |
| 3,666,316 | 5/1972 | Wilfert | 296/93 |
| 4,026,598 | 5/1977 | Koike | 296/146 |
| 4,304,435 | 12/1981 | Everts et al. | 296/213 |
| 4,348,443 | 9/1982 | Hein | 49/490 |
| 4,433,867 | 2/1984 | Perry et al. | 296/146 |

Primary Examiner—Robert R. Song
Attorney, Agent, or Firm—Schwartz, Jeffery, Schwaab, Mack, Blumenthal & Koch

[57] ABSTRACT

A sealing structure for an automotive vehicle prevents turbulent air flow around a front pillar and thus reduces noise due to wind. This seal is provided by a weatherstrip which also seals the space between the front pillar and a front door against water. The weatherstrip is provided with an extension extending towards the opening of the above space to close same. The extension lies approximately flush with the outer surfaces of the front pillar and the front door to form a substantially continuous external surface. This continuous external surface around the front pillar improves the aerodynamics of the vehicle.

10 Claims, 3 Drawing Figures

SEALING STRUCTURE FOR AN AUTOMOTIVE VEHICLE

BACKGROUND OF THE INVENTION

The present invention relates generally to a sealing structure for an automotive vehicle which can provide substantially continuous external surface for the vehicle. More specifically, the invention relates to a sealing structure provided between opposing edges of a front pillar and a front door for preventing turbulent air flow around the front pillar and thus preventing generation of screaming sound.

Nowadays, a smooth external surface of an automotive vehicle is believed to improve aerodynamics of the vehicle and fuel economy. For this purpose, effort has been made to minimize the width of gaps between sections of the vehicle body and generally to make the exterior surfaces of the vehicle smooth and continuous, since such clearances on external vehicle surfaces cause aerodynamic drag and also generate screaming sounds which degrade driving comfort.

On the other hand, there must be some clearance between opposing edges of the front pillar and the front door to allow for the swinging movement of the front door. This clearance may create turbulent air flow around the front pillar and thus create screaming sounds.

SUMMARY OF THE INVENTION

An object of the present invention is to provide a sealing structure which can provide a substantially continuous external surface around the front pillar and prevent turbulent air flow.

Another and more specific object of the present invention is to provide a sealing structure for sealing the clearance between the opposing edges of the front pillar and front door without requiring any expensive elements.

To accomplish the foregoing and other objects, there is provided a sealing structure, according to the present invention, which comprises a weatherstrip installed on a front pillar for establishing a water-tight seal in conjunction with the opposing edge of a front door. The weatherstrip has a sub-seal located between the front pillar and the front door for filling the gap therebetween.

The sub-seal is elastically deformable so that it will not interfere with the swinging movement of the front door but can establish a seal across the clearance to prevent turbulent air flow thereabout.

According to one aspect of the invention, a sealing structure for an automotive vehicle comprises first and second members constituting part of a vehicle body and having edges opposing each other with some clearance therebetween, the first and second members having outer surfaces arranged to form a substantially smooth vehicle body surface and defining an internal space extending from the clearance therebetween, a weatherstrip disposed within the internal space and secured to one of the first and second members and having a sealing lip portion sealingly contacting the other member so as to establish a water-tight seal and an elastically deformable extension integral with the weatherstrip, extending towards the clearance and elastically contacting the edges of both of the first and second members for establishing seal therebetween, one surface of the extension lying approximately in alignment with the outer surfaces of the first and second member so as to form a smooth vehicle body surface.

According to another aspect, a weatherstrip for water-tight seal in an automotive bodywork comprises a major portion adapted to be secured to one vehicle body member, a sealing lip portion extending from the major portion and adapted to sealingly contact the other body member in water-tight fashion for establishing a water-tight seal between said body members, the other body member havng an outer surface arranged in alignment with the outer surface of one body member one edge of which opposes the edge of the other body member with some clearance therebetween, and a closure member integral with the major portion and extending towards the clearance between said body members, part of the surface of the closure member lying in alignment with external surfaces of body members to form a substantially smooth vehicle body surface.

BRIEF DESCRIPTION OF THE DRAWINGS

The present invention will be described in more detail with reference to the accompanying drawings of the preferred embodiment of invention, which, however, should not be considered to limit the invention to the specific embodiment but to be for explanation only.

In the drawings.

DESCRIPTION OF THE PREFERRED EMBODIMENT

Figure 1:
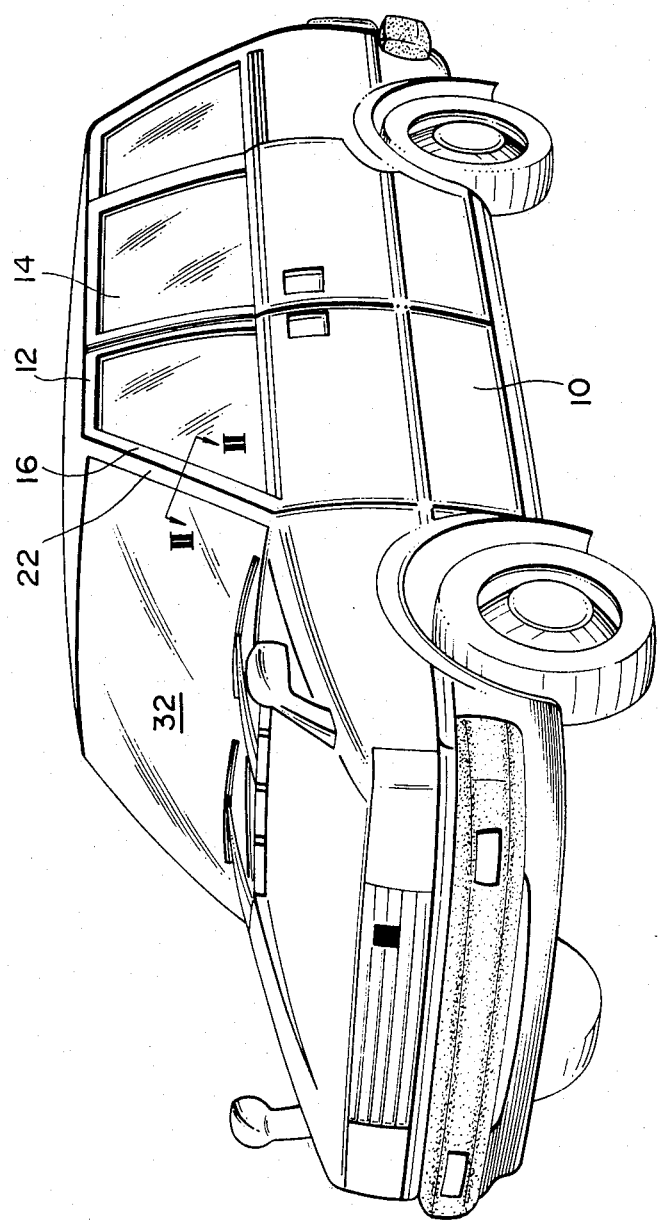
FIG. 1 is a perspective view of an automotive vehicle for which the preferred embodiment of a sealing structure is applied.
Figure 2:
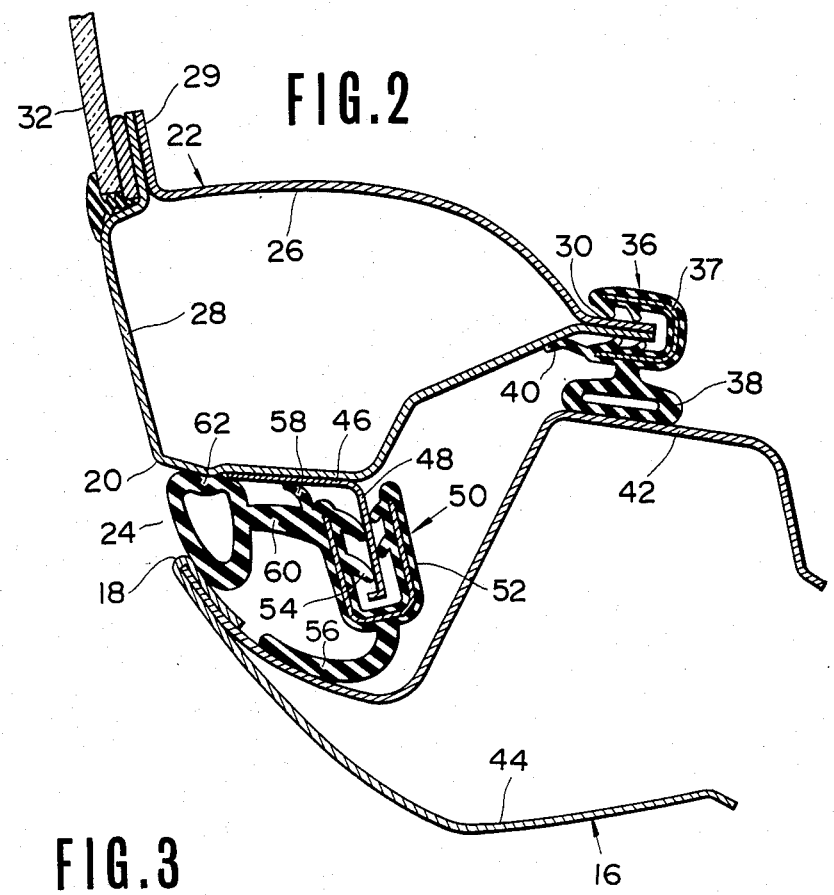
FIG. 2 is a cross-section taken along line II—II of FIG. 1.

Referring now to the drawings, particularly to FIGS. 1 and 2, a vehicle as illustrated, has a front door 10 of the so-called "press-door" type. The front door 10 is provided with a door sash 12 surrounding a window pane 14. The door sash 12 has a front end portion 16 curved inwardly to oppose the front edge 18 to a edge 20 of a front pillar 22. The front edge 18 of the front door sash 12 and the edge 20 of the front pillar 22 are separated by a fixed clearance 24 when the front door 10 is closed.

As shown in FIG. 2, the front pillar 22 comprises inner and outer members 26 and 28 which define an essentially box-shaped cross-section. The outside and inside edges of the inner and outer members 26 and 28 form with flanges 29 and 30 along both vertical edges. The flanges 29 and 30 of the front pillar inner and outer members 26 and 28 help to form the box-like cross-section. A front window pane 32 is bonded to the flange 29 and by a suitable adhesive.

A weatherstrip 36 is installed to the flange 30. The weatherstrip 36 has an essentially U-shaped major portion 37, a substantially hollow-cylindrical extension 38 and an extension strip 40. The cylindrical extension 38 elastically abuts a door sash inner member 42 to which the front edge of a door sash outer member 44 is attached by the process of hemming. The cylindrical extension 38 thus establishes a water-tight seal between the door sash inner member 42 and the flange 30. The extension strip 40 is designed to contact the front pillar outer member 28 to form a water-tight seal.

A retainer 46 is fixedly secured to the front pillar outer member 28 so that a portion 48 thereof projects towards the front door. A weatherstrip 50 is attached to the projection 48 of the retainer 46. The weatherstrip 50 has an essentially U-shaped major portion 52 with inwardly protruding lips 54, sealing lip 56 and 58, and an extension 60 with a substantially hollow cylindrical tip 62.

The sealing lip 56 extends towards the door sash inner member 42 and comes into water-tight contact therewith. The sealing lip 56 with the major portion 52 of the weatherstrip 50 extends along the front pillar 22 and is associated with a drip seal (not shown) attached to a roof side rail to define a drain channel. Likewise, the sealing lip 58 is adapted to sealingly contact the front pillar outer member 28. The extension 60 with the cylindrical tip 62 extends towards the clearance 24 between the front edge 18 of the door sash 12 and the edge 20 of the front pillar 22, so as to contact both of them. The clearance 24 is sealed by the cylindrical tip 62 of the extension so that the air stream flowing around the front pillar will not be disturbed by the gap between the front pillar and the front door.

Figure 3:
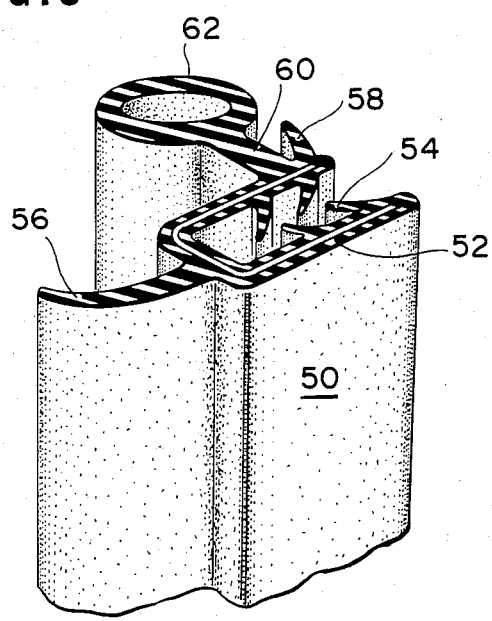
FIG. 3 is a perspective view of a section of a weatherstrip of the sealing structure according to the preferred embodiment.

As shown in FIG. 3, the cylindrical tip 62 of the extension 60 has a substantially circular cross-section and can be deformed elastically in contact with the corresponding surfaces of the door sash and the front pillar outer member. In this position, the cylindrical tip 62 is compressed so that part of its surface is approximately in alignment with the outer surfaces of the front pillar and the front door sash so that it constitutes an essentially smooth external surface, as shown in FIG. 2.

With the sealing structure as set forth, a smooth surface is provided around the front pillar for smooth air flow therearound, thus improving aerodynamics. Since the gap between the front door and the front pillar is filled by the tip of the extension integrally formed with the weatherstrip, turbulent air flow will not be created and thus screaming sounds will not be generated.

Furthermore, according to the shown construction, installation of the seal of the clearance between the front door and the front pillar require no additional parts or process steps. This will help to maintain the cost of manufacture at nearly the conventional level while improving vehicle acoustics and aerodynamics significantly. In addition, the seal established by the tip of the extension may serve to prevent rain water and so forth from entering the vehicle compartment in co-operation with the sealing lip of the weatherstrip 50 and the weatherstrip 36.

It should be appreciated that the tip of the extension need not necessarily be of hollow cylindrical cross-section but can be of any appropriate shape.

What is claimed is:

1. A sealing structure for the automotive vehicle comprising:
    first and second members of a vehicle body having edges opposing each other with a clearance therebetween, said first and second members having outer surfaces arranged to form substantially smooth vehicle body surface and defining an internal space extending from said clearance;
    a weatherstrip disposed within said internal space and secured to one of said first and second members and having a sealing lip portion sealingly contacting the other of said members so as to establish water-tight seal therebetween; and
    an elastically deformable extension integral with said weatherstrip and extending towards said clearance so that said extension elastically contacts said edges of both of said first and second members to establish a seal therebetween, part of the surface of said extension lying approximately in alignment with said outer surfaces of said first and second member.

2. The sealing structure as set forth in claim 1, wherein part of said extension has a substantially hollow-cylindrical cross-section with the outermost top end surface thereof lying flush with the outer surfaces of said first and second members.

3. The sealing structure as set forth in claim 2, wherein said portion of hollow-cylindrical cross-section is formed at the free end of said extension.

4. The sealing structure as set forth in claim 1, wherein said first member is a front pillar of the vehicle body and comprises inner and outer members and said second member is a front door having a door sash comprising inner and outer members, and said weatherstrip is mounted on said front pillar within a space between said front pillar and said front door.

5. The sealing structure as set forth in claim 4, wherein said weatherstrip is mounted on said front pillar by means of a retainer fixedly secured to said front pillar outer member.

6. The sealing structure as set forth in claim 5, wherein said portion of said extension has a substantially hollow-cylindrical cross-section, the outermost surface of which is aligned with the outer surfaces of said front pillar and said front door.

7. A weatherstrip in an automotive vehicle body comprising:
    a major portion adapted to be secured to a first vehicle body member having an outer surface with a edge;
    a sealing lip portion extending from said major portion and adapted to sealingly contact a second vehicle body member in water-tight fashion to establish a water-tight seal between said body members, said second member having an outer surface arranged in alignment with said outer surface of said first body member, and a edge opposing to said edge of said first body member with some clearance therebetween; and
    a closure member integral with said major portion and extending towards said clearance between said body members, said closure member having a surface which lies in alignment with the external surfaces of said body members to form a substantially smooth vehicle body surface.

8. The weatherstrip as set forth in claim 7, wherein said closure member has a tip portion including said surface, said tip portion being sufficiently flexible to conform to the corresponding surfaces of said body members.

9. The weatherstrip as set forth in claim 8, wherein said tip portion is of substantially hollow-cylindrical cross-section.

10. The weatherstrip as set forth in claim 9, wherein said first body member is a front pillar and said second body member is a door sash of a front door and said tip portion is adapted to fill said clearance between said front pillar and said front door sash.

* * * * *